US010360086B2

United States Patent
Langouev et al.

(10) Patent No.: US 10,360,086 B2
(45) Date of Patent: Jul. 23, 2019

(54) FAIR DECENTRALIZED THROTTLING IN DISTRIBUTED CLOUD-BASED SYSTEMS

(71) Applicant: VMware, Inc., Palo Alto, CA (US)

(72) Inventors: Ilia Langouev, Santa Cruz, CA (US); Victor V. Golosovker, Union City, CA (US); Aleksey Pershin, Fremont, CA (US); Bin Wang, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 713 days.

(21) Appl. No.: 14/839,856

(22) Filed: Aug. 28, 2015

(65) Prior Publication Data
US 2017/0063989 A1 Mar. 2, 2017

(51) Int. Cl.
*G06F 9/50* (2006.01)
*G06F 9/54* (2006.01)
*H04L 12/861* (2013.01)
*H04L 29/08* (2006.01)

(52) U.S. Cl.
CPC ............ *G06F 9/546* (2013.01); *G06F 9/5072* (2013.01); *G06F 9/5083* (2013.01); *H04L 49/90* (2013.01); *H04L 67/325* (2013.01)

(58) Field of Classification Search
CPC ...... G06F 9/546; G06F 9/5072; G06F 9/5083; H04L 49/90; H04L 67/325
See application file for complete search history.

(56) References Cited

U.S. PATENT DOCUMENTS

| | | | | |
|---|---|---|---|---|
| 8,681,630 | B1 * | 3/2014 | Gibson | H04L 67/325 370/235 |
| 2010/0205616 | A1 * | 8/2010 | Lai | G06F 9/485 719/320 |
| 2010/0262627 | A1 * | 10/2010 | Costanzo | G06F 17/30595 707/799 |
| 2013/0111500 | A1 * | 5/2013 | Dixon | G06F 9/546 719/314 |
| 2013/0238599 | A1 * | 9/2013 | Burris | G06F 17/3087 707/722 |

* cited by examiner

*Primary Examiner* — Wing F Chan
*Assistant Examiner* — Billy H Ng
(74) *Attorney, Agent, or Firm* — Loza & Loza, LLP (57) ABSTRACT

A cloud availability manager configured to execute a recovery workflow that fails over one or more virtual machines (VMs) to and from a cloud computing system. In doing so, the cloud availability manager typically performs multiple operations for each VMs. The operations involve making several application programming interface (API) calls to component APIs of management components within the cloud computing system. To avoid bringing down the entire cloud infrastructure, the cloud availability manager throttles the API calls to other components while executing a recovery workflow. The throttling spans multiple instances (nodes) of the cloud availability manager and involves cooperation from the other management components to ensure the throttling is fair across all tenants of the cloud computing system.

20 Claims, 6 Drawing Sheets

FAIR DECENTRALIZED THROTTLING IN DISTRIBUTED CLOUD-BASED SYSTEMS

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

SUMMARY

One or more embodiments provide techniques for managing a virtualized computing instance. The method includes registering with a central application programming interface (API) gateway a plurality of component APIs of management components within a cloud computing system. The plurality of component APIs includes a first component API. The method further includes, generating, for each tenant of the cloud computing system, a first queue for synchronous requests to the plurality of component APIs and a second queue for asynchronous requests to the plurality of component APIs. The method includes receiving, at the central API gateway, an API request to a virtualized computing instance in the cloud computing system. The request is associated with a first tenant. The method includes forwarding the request to the first component API based on a state of the first queue and the second queue associated with the first tenant.

Further embodiments include a non-transitory computer-readable storage medium comprising instructions that cause a computer system to carry out the above method above, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the present disclosure provide a cloud availability manager configured to execute a recovery workflow that fails over one or more virtual machines (VMs) to and from a cloud computing system. In doing so, the cloud availability manager typically performs multiple operations for each VM. The operations involve making several application programming interface (API) calls to component APIs of management components within the cloud computing system. To avoid bringing down the entire cloud infrastructure, the cloud availability manager is configured to throttle the API calls to other components while executing a recovery workflow. The throttling spans multiple instances (nodes) of the cloud availability manager and involves cooperation from the other management components to ensure the throttling is fair across all tenants of the cloud computing system. Embodiments of the present disclosure provide a throttling scheme that achieves fairness across tenants without any cross-node or cross-component locking (e.g., to count API requests in the system).

Figure 1:
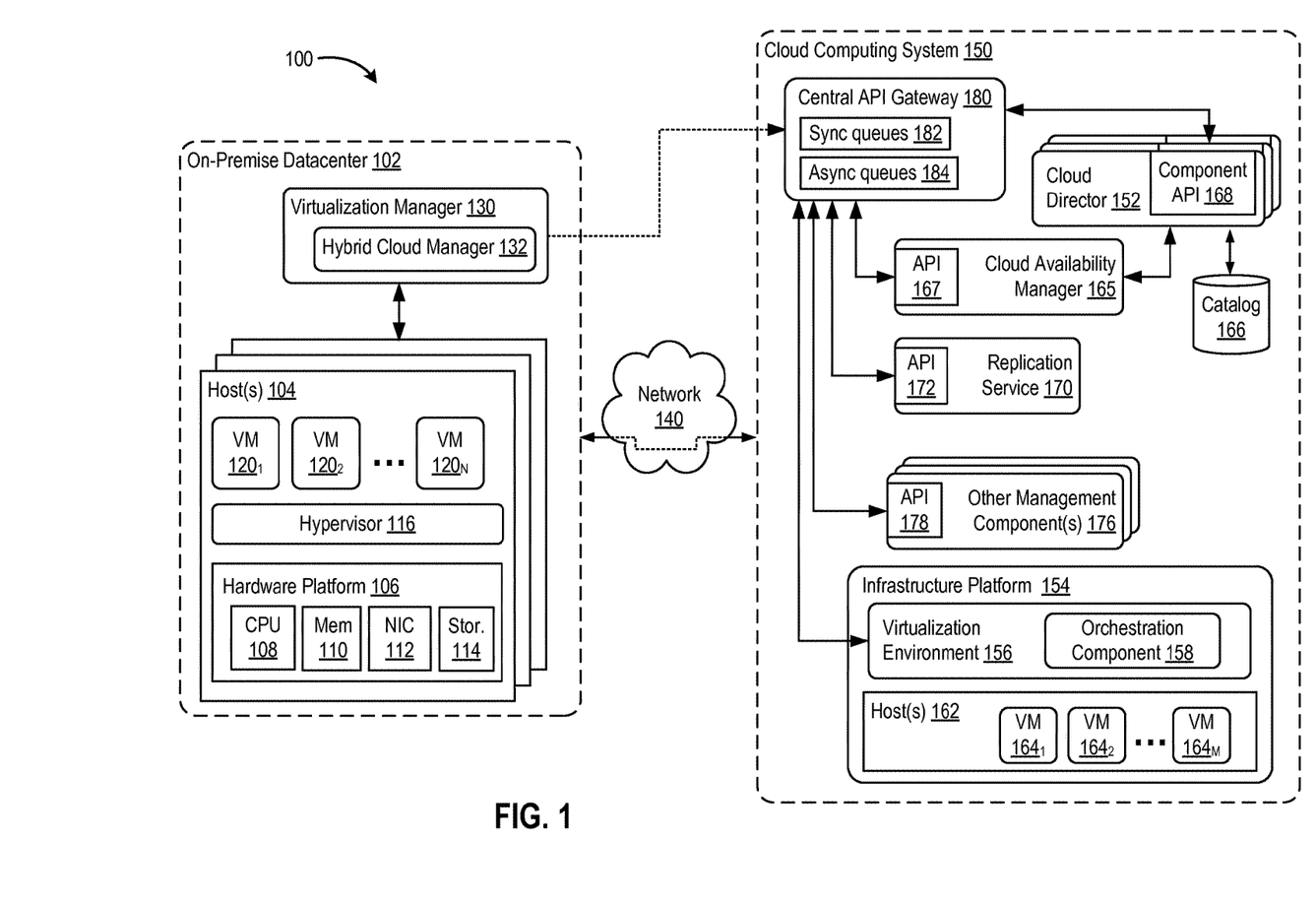
FIG. 1 is a block diagram of a hybrid cloud computing system in which one or more embodiments of the present disclosure may be utilized.

FIG. 1 is a block diagram of a hybrid cloud computing system 100 in which one or more embodiments of the present disclosure may be utilized. Hybrid cloud computing system 100 includes a first virtualized computing system implementing an on-premise datacenter 102 communicatively coupled, via a network 140, to a second virtualized computing system implementing a cloud computing system 150. Hybrid cloud computing system 100 is configured to provide a common platform for managing and executing virtual workloads seamlessly between on-premise datacenter 102 and cloud computing system 150. In one embodiment, on-premise datacenter 102 may be a data center controlled and administrated by a particular enterprise or business organization, while cloud computing system 150 may be operated by a cloud computing service provider and exposed as a service available to account holders, such as the particular enterprise in addition to other enterprises. As such, on-premise datacenter 102 may sometimes be referred to as a "private" cloud, and cloud computing system 150 may be referred to as a "public" cloud.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

On-premise datacenter 102 includes one or more host computer systems ("hosts 104"). Hosts 104 may be constructed on a server grade hardware platform 106, such as an x86 architecture platform. As shown, hardware platform 106 of each host 104 may include conventional components of a computing device, such as one or more processors (CPUs) 108, system memory 110, a network interface 112, storage system 114, and other I/O devices such as, for example, a mouse and keyboard (not shown). CPU 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network interconnecting hosts 104 within on-premise datacenter 102. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi™ hypervisor provided as part of the VMware vSphere® solution made commercially available from VMware, Inc. of Palo Alto, Calif. Hypervisor 116 may run on top of the operating system of host 104 or directly on hardware components of host 104.

On-premise datacenter 102 includes a virtualization management component (depicted in FIG. 1 as virtualization manager 130) that may communicate to the plurality of hosts 104 via a network, sometimes referred to as a management network. In one embodiment, virtualization manager 130 is a computer program that resides and executes in a central server, which may reside in on-premise datacenter 102, or alternatively, running as a VM in one of hosts 104. One example of a virtualization manager is the vCenter Server™ product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by cloud computing system 150 with virtualized computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative tasks, as described in greater detail later. In one implementation, hybrid cloud manager 132 is a module or plug-in complement to virtualization manager 130, although other implementations may be used, such as a separate computer program executing in a central server or running in a VM in one of hosts 104. One example of hybrid cloud manager 132 is the VMware vCloud Connector® product made available from VMware, Inc.

In one or more embodiments, cloud computing system 150 is configured to dynamically provide an enterprise (or users of an enterprise) with one or more virtual data centers in which a user may provision VMs 164, deploy multi-tier applications on VMs 164, and/or execute workloads. Cloud computing system 150 includes an infrastructure platform 154 upon which a cloud computing environment may be executed. In the particular embodiment of FIG. 1, infrastructure platform 154 includes hardware resources having computing resources (e.g., hosts 162), storage resources (e.g., storage array systems), and networking resources, which are configured in a manner to provide a virtualization environment 156 that supports the execution of a plurality of virtual machines 164 across hosts 162. It is recognized that hardware resources 160 of cloud computing system 150 may in fact be distributed across multiple data centers in different locations.

Each cloud computing environment is associated with a particular tenant of cloud computing system 150, such as the enterprise providing virtualized computing system 102. In one embodiment, the cloud computing environment is configured as a dedicated cloud service for a single tenant comprised of dedicated hardware resources (i.e., physically isolated from hardware resources used by other users of cloud computing system 150). In other embodiments, the cloud computing environment is configured as part of a multi-tenant cloud service with logically isolated virtualized computing resources on a shared physical infrastructure. Cloud computing system 150 may support multiple cloud computing environments, available to multiple enterprises in single-tenant and multi-tenant configurations.

In one embodiment, virtualization environment 156 includes an orchestration component 158 (e.g., implemented as a process running in a VM) that provides infrastructure resources to a cloud computing environment responsive to provisioning requests. For example, if a tenant required a specified number of virtual machines to deploy a web application or to modify (e.g., scale) a currently running web application to support peak demands, orchestration component 158 can initiate and manage the instantiation of virtual machines (e.g., VMs 164) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of the cloud computing environment and provides additional infrastructure resources to the cloud computing environment as needed or desired. In one example, similar to on-premise datacenter 102, virtualization environment 156 may be implemented by running on hosts 162 VMware ESXi™-based hypervisor technologies provided by VMware, Inc. (although it should be recognized that any other virtualization technologies, including Xen® and Microsoft Hyper-V® virtualization technologies may be utilized consistent with the teachings herein).

In one embodiment, cloud computing system 150 may include a cloud director 152 (e.g., run in one or more virtual machines) that manages allocation of virtual computing resources to a tenant for deploying applications. Cloud director 152 may be accessible to users via a REST (Representational State Transfer) API (Application Programming Interface) or any other client-server communication protocol. Cloud director 152 may authenticate connection attempts from the tenant using credentials issued by the cloud computing provider. Cloud director 152 maintains and publishes a catalog 166 of available virtual machine templates and packaged virtual machine applications that represent virtual machines that may be provisioned in a cloud computing environment. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp Template technology made available by VMware, Inc., although other technologies may be utilized. Cloud director 152 receives provisioning requests submitted (e.g., via REST API calls) and may propagate such requests to orchestration component 158 to instantiate the requested virtual machines (e.g., VMs 164). One example of cloud director 152 is the VMware vCloud Director® produced by VMware, Inc.

In the embodiment of FIG. 1, the cloud computing environment supports the creation of a virtual data center having a plurality of virtual machines 164 instantiated to, for example, host deployed multi-tier applications. A virtual data center is a logical construct that provides compute, network, and storage resources to an organization. Virtual data centers provide an environment where VMs 164 can be created, stored, and operated, enabling complete abstraction between the consumption of infrastructure service and underlying resources. VMs 164 may be configured similarly to VMs 120, as abstractions of processor, memory, storage, and networking resources of hosts 162 and other hardware resources.

In one or more embodiments, cloud computing system 150 includes a cloud availability manager 165 configured to orchestrate disaster recovery workflows from the on-premise data center to cloud computing system 150 and back. That is, cloud availability manager 165 enables tenants to use cloud computing system 150 as disaster recovery site. In some embodiments, cloud availability manager 165 uses host-based replication technology to replicate running VMs to and from cloud computing system 150, although in other embodiments, array-based data replication may be used as well. An example cloud availability manager 165 configured to perform the described operations is the Site Recovery Manager Air™ made available by VMware, Inc. In one embodiment, cloud availability manager 165 uses a separate service (replication service 170) configured to perform host-based replication on infrastructure platform 154. An example host-based replication techniques may be provided by vSphere™ Replication technology made available by VMware, Inc.

In one scenario, a tenant user specifies recovery plans and configures replication to cloud computing system 150 for a number of VMs that need disaster recovery protection. A recovery plan refers to a collection of VMs replicated in the same direction (e.g., from on-premise to cloud). The user can configure dependencies between VMs, and for each VM specify Internet Protocol (IP) customization parameters to be used during a failover, assign scripts to each VM, and so forth. Once the recovery plan is configured, the user can run various recovery workflows for the recovery plan (e.g., planned failover, forced failover, test failover, etc.) During the execution of a workflow for a recovery plan, cloud availability manager 165 can perform all steps for each VM with as much parallelism as allowed by the constraints configured by the user (i.e., VM dependencies, priority tiers). Executing a workflow typically involves making multiple API calls (e.g., REST API calls) to a component API 168 (hereinafter simply referred to as an API) of cloud director 152 or to an API 172 of a replication service 170. Cloud director 152 and replication service 170 are examples of management components or services within cloud computing system 150, and other management components and services are generically depicted in FIG. 1 as other management components 176 having APIs 178 within cloud computing system 150.

A typical recovery plan workflow may contain five to ten tasks to be performed for each VM. For example, one recovery plan may include one task to synchronize the state of a VM with a recovery VM, another task to power off the original VM, another task to re-synchronize the state again, a task to fail over to the recovery VM, a task to customize the recovery VM, and a task to power on the recovery VM. Consequently, a recovery workflow for a recovery plan with 1,000 VMs would contain 5,000-10,000 tasks. Again, to execute each task, cloud availability manager 165 would have to make several REST API calls to the management components of cloud computing system 150 (e.g., cloud director 152, replication service 170, etc.)

In some embodiments, component APIs are implemented as synchronous calls, i.e., the caller is blocked while the management component is processing the call. Synchronous calls are generally able to be processed and completed by the server relatively quickly. In contrast, APIs that have a substantial processing time are implemented as asynchronous calls. For asynchronous APIs, when a client makes a call, the management component first creates a temporary tracking object referred herein to as a "task," then starts processing the call. It is noted that the management component completes the call without waiting for the processing to complete. Instead, the management component returns the task back to the client. The client starts polling on the task properties such as progress and completion status while the management component is processing the request and updates these properties. Once the management component completes processing the request, the management component marks the task as completed and assigns the results of the processing to the task. When the client notices that the task has been marked as completed, the client retrieves the results of the operation (if any) from the task object.

If cloud availability manager 165 were to execute a recovery workflow without applying any throttling, the result might be thousands or even millions of REST API requests being made to cloud director 152 and replication service 170 (which might itself make calls to the API of cloud director 152). This cascading behavior may bring the entire cloud infrastructure to a halt, making cloud computing system 150 inaccessible to all other clients. One approach to this problem may be to implement request throttling in each server or management component However, in this approach, if the number of requests in the queue is large, the management component may take a significant amount of time even to start processing a request from the queue. By that time, a client may have already timed out of the request from the client-side. Increasing client side request timeouts would not help either. Setting the timeouts to be longer in duration (to accommodate potentially large throttling queues) can result in the client taking too much time to detect if the other components have legitimately failed and report the problem to the user. For example, if a client were to use a 24-hour request timeout to give enough time for other management components to process requests, 24 hours may elapse before the client is able to detect that the other component has failed. Such long delays may be unacceptable in disaster recovery scenarios in which a user is trying to recover from a disaster as quickly as possible.

Furthermore, in some embodiments, each management component within cloud computing system 150 is implemented in a multi-node cluster. For example, multiple instances of cloud director 152 are depicted in FIG. 1. In order to achieve a balanced load on a cluster of management components, a successful throttling scheme has to be applied in a load balancer that fronts the cluster and distributes requests to each node in the cluster. Load balancers are typically implemented as generic components without knowledge about the contents of each request. Thus, a load balancer may have difficulty in understanding which requests are easy and quick to process and which request may take a significant amount of time to process. While one simple approach may be to maintain a counter at the load balancer that counts how many requests each node is processing to determining to which node to send a new request. However, under this approach, the load balancer may overload one node by sending that node too many heavy requests.

Asynchronous (i.e., task-based) requests can present a particular problem for throttling. Typically, a management component needs to return a task object to a client as soon as possible to allow the client to track the progress of the request. After that, in some approaches, the management component places the task into a queue. At this point, the task is said to be in a queued state. The management component then starts processing tasks from the queue. Once the management component starts processing a task, the management component marks the task as running and starts reporting progress for the task. In some approaches, there can be different throttling limits for the number of queued tasks and the number of running tasks for each management component. If the management component is overloaded, tasks may stay in the queued state for such a long time that the client may time out the tasks on the client's side before the management component even starts processing the task. As described above, simply using longer timeout durations for tasks may not be a tenable solution because of the effect on detecting component failures in a timely manner.

Another approach is to throttle outgoing requests on the client-side of cloud availability manager 165. If cloud availability manager 165 is implemented as a multi-node cluster, then the throttling would require some form of a distributed request queue spanning all nodes in the cluster, possibly needing some form of distributed locking or a transactionally consistent database, which are inefficient from a performance point of view. Further, client side throttling may suffer from fairness problems across tenants of cloud computing system 150. Using a client side throttling scheme, cloud availability manager 165 may not know how many requests are being processed for each tenant by other management components.

Accordingly, in one or more embodiments, cloud computing system 150 includes a central API gateway 180 configured to maintain a certain allotment of REST API calls that each tenant of cloud computing system 150 is allowed to make against the cloud infrastructure. Central API gateway 180 maintains the allotments between requests initiated by management components themselves and requests initiated directly by a tenant client. In some embodiments, central API gateway 180 interacts with components APIs of each management component within cloud computing system 150, such as API 168 of cloud director 152, API 167 of cloud availability manager 165, API 172 of replication service 170, API(s) 178 of management components 176, as well as APIs (not shown) of infrastructure platform 154 and orchestration component 158.

In the described use case, the throttling scheme prevents one tenant from interfering with other tenants in a cloud computing system. However, while embodiments of the present disclosure are described in the context of virtualized computing instances and a cloud computing system, it should be noted that the described techniques may be used to throttle API calls across any multiple components that are not tightly coupled with each other. That is, a collection of services which provide some operations to come clients, it can be desirable to make the services reliable enough to withstand attacks from clients that try to overload the system. In one example, parts of a same data center may employ the described throttling scheme to guard against other parts of the same center misbehaving and overloading the system. In other words, in one alternative embodiment, the system 150 does not have to be a fully independent cloud computing system, but can be a private data center that owns the systems 102. In yet other embodiments, systems 150 and 102 can be parts of the same data center controlled by the same organization.

Figure 2A:
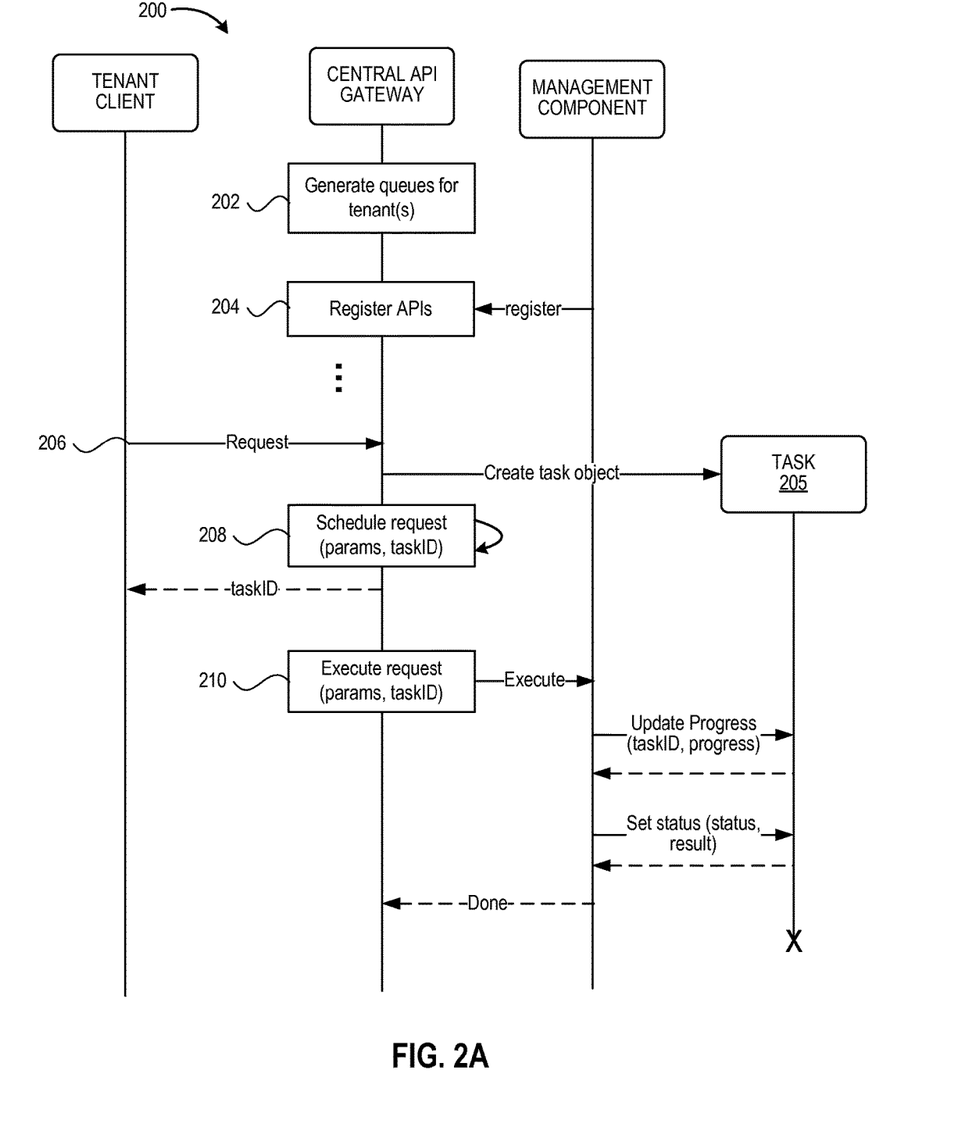
FIGS. 2A and 2B are sequence diagrams for operations of a throttling scheme that manages requests in a cloud computing system, according to an embodiment.

FIG. 2A is a sequence diagram for operations 200 of a throttling scheme that manages requests in a cloud computing system 150, according to an embodiment. While FIG. 2A is described in conjunction with the systems of FIG. 1, it should be understood that embodiments of the present disclosure may be performed using other similar systems and structures.

Operations 200 begin at 202, where central API gateway 180 generates and maintains a first queue 182 for synchronous requests and a second queue 184 for asynchronous requests for each tenant of cloud computing system 150. In some embodiments, synchronous queue 182 may be made of a sub-queue for queued tasks for synchronous requests and another sub-queue for running tasks for synchronous requests for a given tenant. Similarly, asynchronous queue 184 may be comprised of one sub-queue for queued tasks for asynchronous requests and another sub-queue for running takes for asynchronous requests for a given tenant. Queues 182, 184 may be considered "global" as each queue 182, 184 pertains to all requests associated with a given tenant within cloud computing system 150 regardless of which management component the request is for.

In some embodiments, the size of each queue 182, 184 is controlled by tenant-specific limits. Central API gateway 180 determines the size of queues 182, 184 based on how many synchronous requests can be processed at the same time, how many synchronous requests can be queued at the same time, how many asynchronous requests (i.e., tasks) can be queued at the same time, and how many asynchronous requests can be running at the same time. In some embodiments, the limits for queued and running tasks can be implemented as a global per-tenant limit. For example, central API gateway 180 may set for a particular tenant a limit of 1,000 queued synchronous requests and 100 running synchronous requests. In some embodiments, the limits for queued and running requests can be implemented as API specific per-tenant limits, which enables cloud computing system 150 to implement different throttling limits for time-consuming and time-light requests (synchronous and asynchronous).

At 204, each management component within cloud computing system 150 (e.g., cloud director 152, cloud availability manager 165, etc.) registers some or all of its component APIs with central API gateway 180. For each REST API, the management component may specify whether a request to the component API is a synchronous request or an asynchronous (i.e., task-based) request. The registrations for components APIs may further specify a type of the API request.

In one implementation, a management component may provide a resource address or path (e.g., URL) for a component API, a REST method (e.g., GET, PUT, POST, etc.), an indication of whether the request is synchronous or asynchronous, a type of API, and one or more network address for the cluster of management components. For example, cloud availability manager 165 registers an API at the URL "/cam/rp/{id}", which has a GET request, which is a synchronous request, and which may be found at the network addresses "IP1", "IP2", and "IP3".

It is noted that operations 202 and 204 may be preferred when the components of cloud computing system 150 start. That is, operations 202 and 204 may be performed once upon initialization and startup of cloud computing system 150, while subsequent operations (operations 206 and onward) in FIG. 2A-B may be repeated, at least once for each REST API request received.

At 206, central API gateway 180 receives a request from a client associated with a particular tenant ("tenant client"). Responsive to receiving a request to create a task, central API gateway 180 requests creation of a task object 205 corresponding to the request from the management component and returns a task ID back to the tenant client. For synchronous requests, central API gateway 180 may proceed directly to block 208.

At blocks 208, central API gateway 180 may schedule and execute the request based on a state of the queues 182, 184 associated with the tenant. At block 210, at the scheduled time, central API gateway 180 directs the management component to the executed the particular request, passing parameters and a task identifier. The management component communicates with task 205 to update the progress of the task and set the completed status and return results. Details for describing when the request is processed and handled are described in greater detail in conjunction with FIGS. 3A and 3B.

Figure 2B:
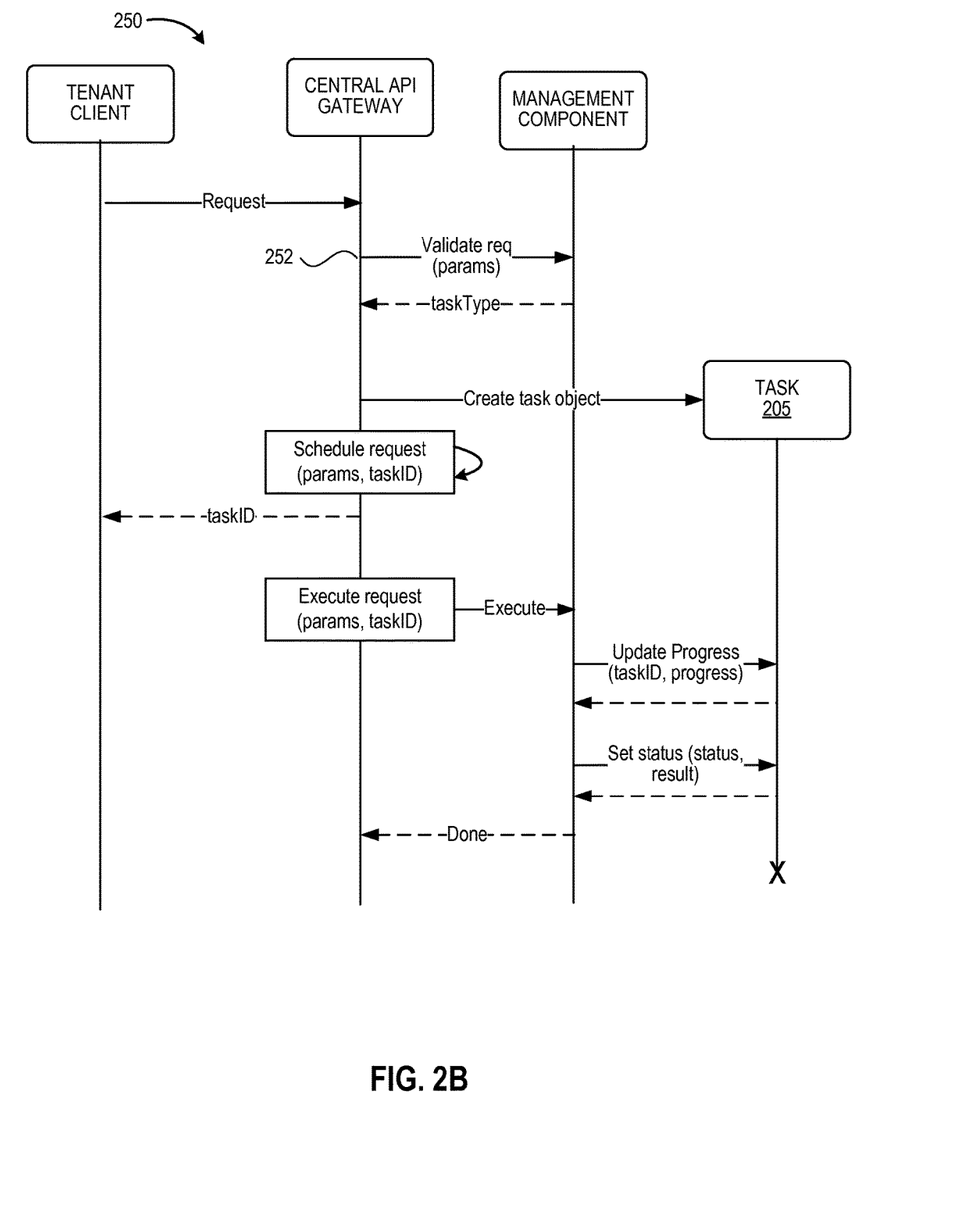

FIG. 2B is a sequence diagram for operations 250 of a throttling scheme that manages requests in a cloud computing system 150, according to an embodiment. Operations 250 are a variation of the operations depicted in FIG. 2B, except that central API gateway 180 first makes a validation request, at block 252, to the management component. Central API gateway 180 receives a task type and other information about the request from the management component, and then creates a task object. Operations 250 may continue as depicted in FIG. 2A.

Figure 3A:
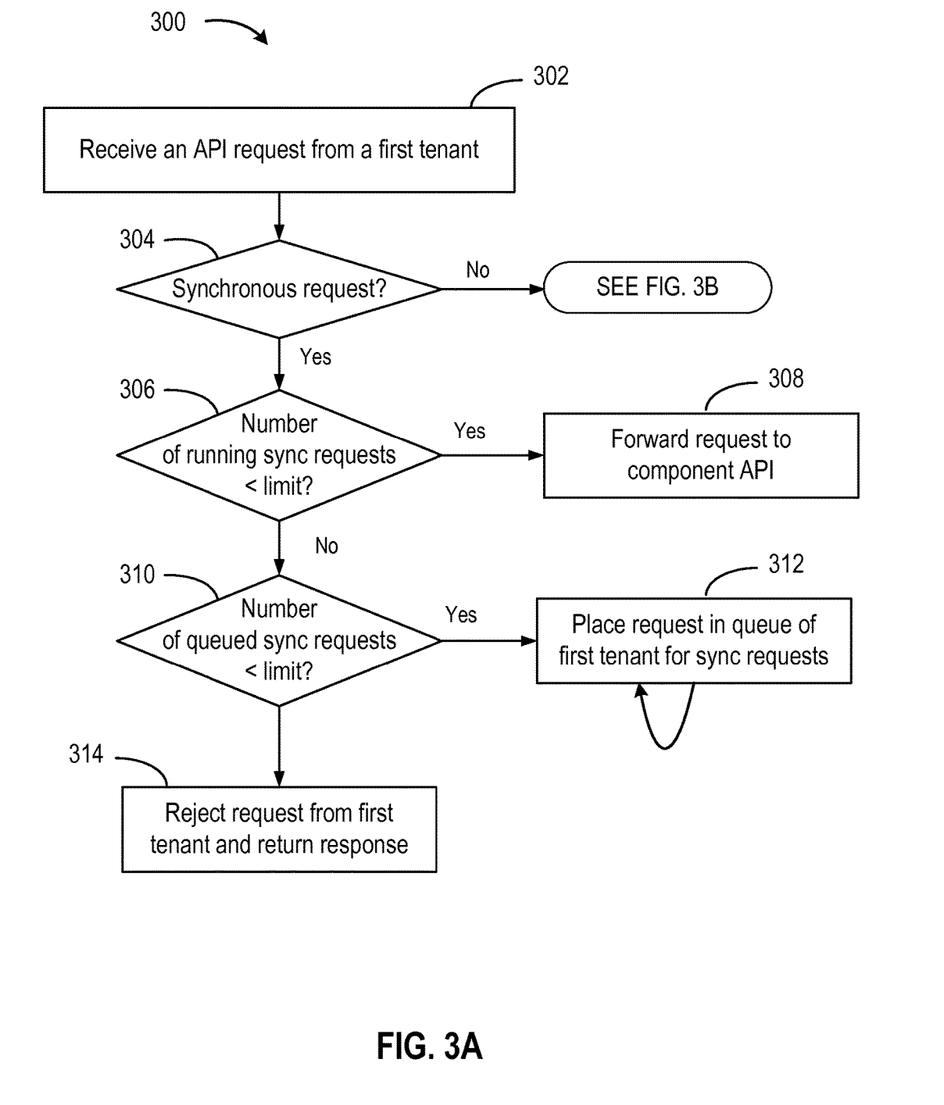
FIGS. 3A and 3B are flow diagram depicting method for throttling API requests in a cloud computing system, according to one embodiment of the present disclosure.
Figure 3B:
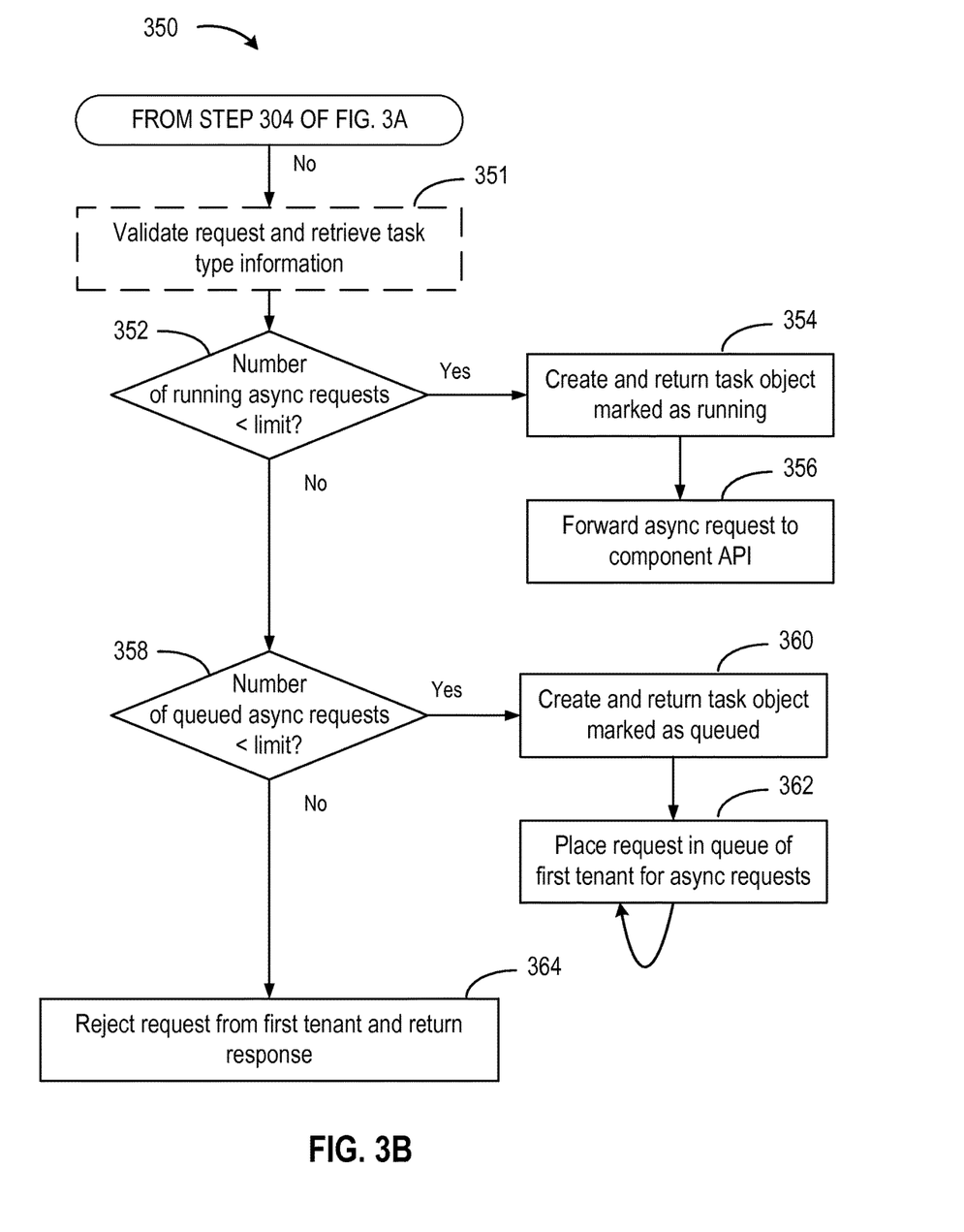

FIGS. 3A and 3B are flow diagrams illustrating a method 300 for throttling API requests in a cloud computing system, according to one embodiment of the present disclosure. While method 300 is described in conjunction with the systems shown in FIG. 1, it should be recognized that other systems may be used to perform the described methods.

Method 300 begins at step 302, where central API gateway 180 receives an API request associated with a particular tenant. For example, the tenant client may be a hybrid cloud manager 132 or virtualization manager 130 of an on-premise data center. In other cases, the tenant client may be a management component within cloud computing system 150 acting at the direction of a particular tenant. Such cases might arise where one management component requests the actions of other management components within cloud computing system 150. Nonetheless, these requests still get funneled through central API gateway 180 to ensure fair throttling is applied to all request activity in cloud computing system 150. In some embodiments, when a management component makes a call to another management component (via central API gateway 180), the calling management component makes the call within the context of the tenant to place the call into the appropriate queue. In other embodiments, the API request may be received from other sources besides a tenant client, for example, the tenant may have a script performing tasks through the API.

At step 304, central API gateway 180 determines whether the request from the tenant client is a synchronous request or an asynchronous request. In some embodiments, central API gateway 180 performs a lookup of registered component APIs (as described in FIG. 2A-B above), for any APIs matching received request. Central API gateway 180 may then determine whether the component API is registered as a synchronous request or an asynchronous request.

At step 306, central API gateway 180 checks whether the number of outstanding (i.e., currently running) synchronous requests is below the tenant-specific limit. If so, at step 308, responsive to determining that a number of running tasks in queue 182 for synchronous requests associated with the particular tenant does not exceed a limit, central API gateway 180 forward the request to the API of the corresponding management component for processing. The term "tenant-specific limit" as used herein refers to both limits associated with a particular tenant and limits associated with a particular type of request, and both.

Otherwise, at step 310, central API gateway 180 checks whether the number of queued synchronous requests is below the tenant-specific limit. If so, at step 312, responsive to determining that a number of queued tasks in queue 182 for synchronous requests associated with the particular tenant does not exceed the limit associated with the tenant, central API gateway 180 places the request into the synchronous request queue 182. Once the number of outstanding requests synchronous requests drops below the limit (subsequent to being placed in the queue 182), central API gateway 180 may start sending queued synchronous requests to the corresponding management component for processing.

At step 314, responsive to determining that the number of queued tasks has exceeded the tenant-specific limit, central API gateway 180 rejects the request from the tenant. In some embodiments, central API gateway 180 returns a response message indicating an "Service Unavailable" error has occurred. In one implementation, central API gateway may use an HTTP status code (e.g., "503") indicating the corresponding management component is unavailable, and further indicating that the tenant has exceeds the number of requests assigned to that tenant.

Referring back to step 304, responsive to determining that the received request is an asynchronous request, central API gateway 180 may proceed with method 350 depicted in FIG. 3B. Method 350 begins at step 351, where central API gateway 180 optionally makes a validation call to the management component and retrieves task type form the management component. At step 352, central API gateway 180 checks whether the number of running tasks is below the tenant-specific limit. If so, at step 354, responsive to determining that the number of running tasks in queue 184 for asynchronous requests does not exceed the limit associated with the tenant, central API gateway 180 generates a task object for the request. The task object is marked such that the object indicates that the task is running and is assigned a task ID. Central API gateway 180 immediately transmits the task object in a response back to the tenant client. At step 356, central API gateway 180 proceeds to forward the asynchronous request to the component API of the corresponding management component for processing. In some embodiments, central API gateway 180 passes the ID of the task object to the management component, allowing the management component to update the task with progress and results. The term "tenant-specific limit" as used herein refers to both limits associated with a particular tenant and limits associated with a particular type of request, and both.

At step 358, responsive to determining that the number of running tasks has reached a tenant-specific limit, central API gateway 180 checks whether the number of queued tasks has reached the tenant-specific limit. If so, at step 360, responsive to determining that the number of queued tasks is below the tenant-specific limit, central API gateway 180 still generates a task object for the request, except this time the task object is marked such that the object indicates that the task is queued. Central API gateway 180 returns the task object (having a task identifier) in a response back to the tenant client. At step 362, central API gateway 180 places the asynchronous request in queue 184 for asynchronous requests associated with the tenant. Subsequent to placing this request in the asynchronous queue, central API gateway 180 may continue to monitor the queue and once the number of running tasks drops below the tenant-specific limit, central API gateway 180 examines queue 184 for pending asynchronous requests and forwards the request for which the per-task type limits are satisfied to the component API of the corresponding management component, together with the corresponding task ID.

At step 362, responsive to determining that number of queued tasks associated with the tenant exceeds the tenant-specific limit, central API gateway 180 rejects the request from the tenant client. In some embodiments, central API gateway 180 returns a "Service Unavailable" error response (e.g., HTTP status code 503) to the tenant client indicating that the management request has been rejected due to exceeding the tenant-specific limit.

In one or more embodiments, tenant clients and management components 176 of cloud computing system 150 are configured to receive a "Service Unavailable" error message for any request. Each management component 176 may be configured to wait a predefined period of time and retry the request. As discussed above, the management component may safely retry the request as it is determined that the original request has been rejected fully (as opposed to being processed or queued for an inordinate amount of time.)

Figure 4:
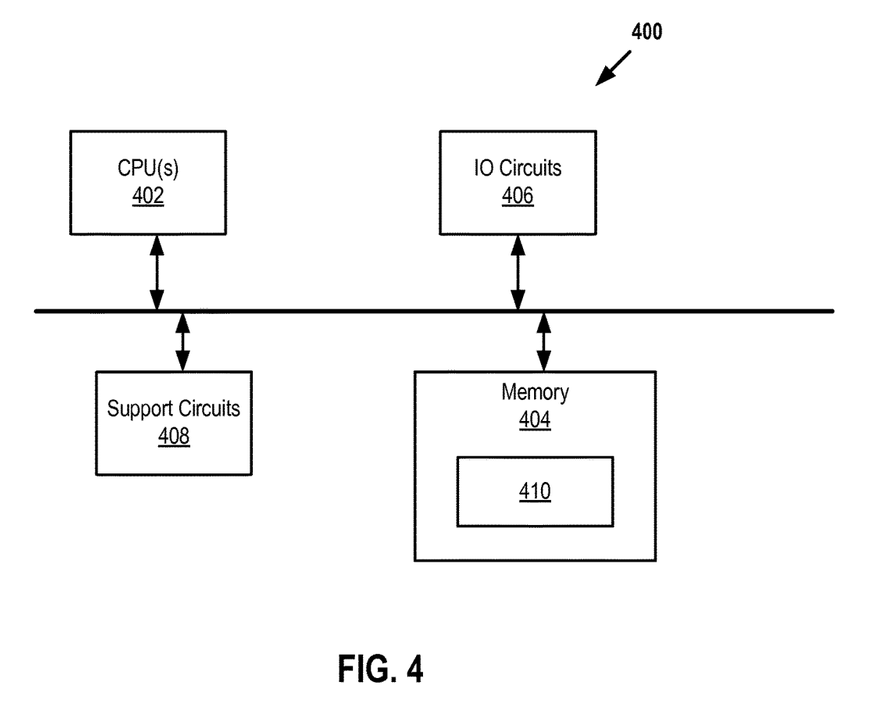
FIG. 4 is a block diagram depicting an example of a computer system in which one or more embodiments of the present disclosure may be utilized.

FIG. 4 is a block diagram depicting an example of a computer system 400 in which one or more embodiments of the present disclosure may be utilized. Computer system 400 can be used as a host to implement hybrid cloud manager 132, central API gateway 180, or other component described above. Computer system 400 includes one or more central processing units (CPUs) 402, memory 404, input/output (JO) circuits 406, and various support circuits 408. Each of CPUs 402 can include any microprocessor known in the art and can execute instructions stored on computer readable storage, such as memory 404. Memory 404 can include various volatile and/or non-volatile memory devices, such as random access memory (RAM), read only memory (ROM), and the like. Instructions and data 410 for performing the various methods and techniques described above can be stored in memory 404 for execution by CPUs 402. That is, memory 404 can store instructions executable by CPUs 402 to perform one or more steps/sub-steps described above in FIGS. 3 and 4. Support circuits 408 include various circuits used to support operation of a computer system as known in the art.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of managing a computing instance, comprising:
    registering with a central application programming interface (API) gateway a plurality of component APIs of management components within a computing system, wherein the plurality of component APIs includes a first component API;
    generating, for each tenant of the computing system, a first queue for synchronous requests to the plurality of component APIs and a second queue for asynchronous requests to the plurality of component APIs;
    receiving, at the central API gateway, an API request associated with a first tenant;
    when a number of running requests that are associated with the first tenant and are the same type as the API request does not exceed a first limit, forwarding the API request to the first component API; and
    when the number of running requests that are associated with the first tenant and are the same type as the API request does exceed the first limit, placing the API request in one of the first queue for synchronous requests and the second queue for asynchronous requests associated with the first tenant based on a state of the first queue and the second queue associated with the first tenant.

2. The method of claim 1, wherein registering the plurality of component APIs of the management components comprises specifying that a request to the component API is one of a synchronous request and an asynchronous request.

3. The method of claim 1, wherein the first queue comprises a first sub-queue for queued tasks for synchronous requests for the first tenant and a second sub-queue for running tasks for synchronous requests for the first tenant, and
    wherein the second queue comprises a third sub-queue for queued tasks for asynchronous requests for the first tenant and a fourth sub-queue for running tasks for asynchronous request for the first tenant.

4. The method of claim 1, wherein the request comprises a synchronous request, and wherein placing the API request in one of the first queue for synchronous requests and the second queue for asynchronous requests associated with the first tenant based on the state of the first queue and the second queue associated with the first tenant comprises:
    responsive to determining that a number of running synchronous requests associated with the first tenant exceed the first limit associated with the first tenant:
        responsive to determining that a number of queued synchronous requests in the first queue associated with the first tenant does not exceeds a second limit associated with the first tenant, placing the request into the first queue for synchronous requests;
        responsive to determining that the number of queued synchronous requests in the first queue associated with the first tenant exceeds the second limit associated with the first tenant, rejecting the request from the first tenant.

5. The method of claim 4, further comprising:
    subsequent to placing the request into the first queue, forwarding the request to the first component API responsive to determining that the number of running synchronous requests no longer exceeds the first limit associated with the first tenant.

6. The method of claim 1, wherein the request comprises an asynchronous request, and wherein forwarding the API request to the first component API comprises:
    responsive to determining that a number of running tasks for asynchronous requests associated with the first tenant does not exceed a third limit associated with the first tenant:
        generating a task object for the request, wherein the task object is indicated as running;
        transmitting a task identifier of the task object in a response to the first tenant; and
        forwarding the request and the task identifier of the task object to the first component API.

7. The method of claim 6, wherein placing the API request in one of the first queue for synchronous requests and the second queue for asynchronous requests associated with the first tenant based on the state of the first queue and the second queue associated with the first tenant further comprises:

responsive to determining that the number of running tasks for asynchronous requests associated with the first tenant exceeds the third limit associated with the first tenant, and responsive to determining that a number of queued tasks for asynchronous requests in the second queue associated with the first tenant does not exceed a fourth limit associated with the first tenant:
generating a task object for the request, wherein the task object is indicated as queued;
transmitting the task identifier in a response to the first tenant; and
placing the request into the second queue for asynchronous requests.

8. The method of claim 6, wherein forwarding the API request to the first component API comprises:
rejecting the request from the first tenant responsive to determining that the number of running tasks for asynchronous requests associated with the first tenant exceeds the third limit associated with the first tenant, and responsive to determining that a number of queued tasks for asynchronous requests in the second queue associated with the first tenant exceeds a fourth limit associated with the first tenant.

9. The method of claim 6, further comprising:
subsequent to placing the request into the second queue, forwarding the request to the first component API responsive to determining that the number of running tasks for asynchronous requests no longer exceeds the third limit associated with the first tenant.

10. The method of claim 6, further comprising:
prior to generating the task object for the request, validating the request with the management component and receiving task type information associated with the request.

11. The method of claim 1, wherein the first limit is shared between the plurality of management components in the computing system.

12. The method of claim 1, wherein the management component comprises a cluster of instances of the management component.

13. A computer system, comprising:
memory configured to store code; and
one or more processors configured to execute the code to:
register with a central application programming interface (API) gateway a plurality of component APIs of management components within a computing system, wherein the plurality of component APIs includes a first component API;
generate, for each tenant of the computing system, a first queue for synchronous requests to the plurality of component APIs and a second queue for asynchronous requests to the plurality of component APIs;
receive, at the central API gateway, an API request associated with a first tenant;
when a number of running requests that are associated with the first tenant and are the same type as the API request does not exceed a first limit, forward the API request to the first component API; and
when the number of running requests that are associated with the first tenant and are the same type as the API request does exceed the first limit, place the API request in one of the first queue for synchronous requests and the second queue for asynchronous requests associated with the first tenant based on a state of the first queue and the second queue associated with the first tenant.

14. The computer system of claim 13, wherein the first queue comprises a first sub-queue for queued tasks for synchronous requests for the first tenant and a second sub-queue for running tasks for synchronous requests for the first tenant, and
wherein the second queue comprises a third sub-queue for queued tasks for asynchronous requests for the first tenant and a fourth sub-queue for running tasks for asynchronous request for the first tenant.

15. The computer system of claim 13, wherein the request comprises a synchronous request, and wherein the one or more processors configured to execute the code to place the API request in one of the first queue for synchronous requests and the second queue for asynchronous requests associated with the first tenant based on the state of the first queue and the second queue associated with the first tenant are further configured to:
responsive to determining that a number of running synchronous requests associated with the first tenant exceed the first limit associated with the first tenant:
responsive to determining that a number of queued synchronous requests in the first queue associated with the first tenant does not exceeds a second limit associated with the first tenant, place the request into the first queue for synchronous requests;
responsive to determining that the number of queued synchronous requests in the first queue associated with the first tenant exceeds the second limit associated with the first tenant, reject the request from the first tenant.

16. The computer system of claim 15, further comprising:
subsequent to placing the request into the first queue, forwarding the request to the first component API responsive to determining that the number of running synchronous requests no longer exceeds the first limit associated with the first tenant.

17. The computer system of claim 13, wherein the request comprises an asynchronous request, and wherein the one or more processors configured to execute the code to forward the API request to the first component API are further configured to:
responsive to determining that a number of running tasks for asynchronous requests associated with the first tenant does not exceed a third limit associated with the first tenant:
generate a task object for the request, wherein the task object is indicated as running;
transmit a task identifier of the task object in a response to the first tenant; and
forward the request and the task identifier of the task object to the first component API.

18. The computer system of claim 17, wherein the one or more processors configured to execute the code to place the API request in one of the first queue for synchronous requests and the second queue for asynchronous requests associated with the first tenant based on a state of the first queue and the second queue associated with the first tenant are further configured to:
responsive to determining that the number of running tasks for asynchronous requests associated with the first tenant exceeds the third limit associated with the first tenant, and responsive to determining that a number of queued tasks for asynchronous requests in the second queue associated with the first tenant does not exceed a fourth limit associated with the first tenant:
generate a task object for the request, wherein the task object is indicated as queued;

transmit the task identifier in a response to the first tenant; and place the request into the second queue for asynchronous requests.

19. The computer system of claim 17, wherein the one or more processors are configured to execute the code to:

reject the request from the first tenant responsive to determining that the number of running tasks for asynchronous requests associated with the first tenant exceeds the third limit associated with the first tenant, and responsive to determining that a number of queued tasks for asynchronous requests in the second queue associated with the first tenant exceeds a fourth limit associated with the first tenant; and subsequent to placing the request into the second queue, forward the request to the first component API responsive to determining that the number of running tasks for asynchronous requests no longer exceeds the third limit associated with the first tenant.

20. A non-transitory computer readable medium comprising instructions, which when executed in a computer system, causes the computer system to carry out a method of managing API requests, comprising:

registering with a central application programming interface (API) gateway a plurality of component APIs of management components within a computing system, wherein the plurality of component APIs includes a first component API;

generating, for each tenant of the computing system, a first queue for synchronous requests to the plurality of component APIs and a second queue for asynchronous requests to the plurality of component APIs;

receiving, at the central API gateway, an API request associated with a first tenant;

when a number of running requests that are associated with the first tenant and are the same type as the API request does not exceed a first limit, forwarding the API request to the first component API; and when the number of running requests that are associated with the first tenant and are the same type as the API request does exceed the first limit, placing the API request in one of the first queue for synchronous requests and the second queue for asynchronous requests associated with the first tenant based on a state of the first queue and the second queue associated with the first tenant.

* * * * *